H. L. HUBBARD.
HEADLIGHT ATTACHMENT FOR AUTOMOBILES.
APPLICATION FILED MAY 19, 1914.
1,124,024.
Patented Jan. 5, 1915.
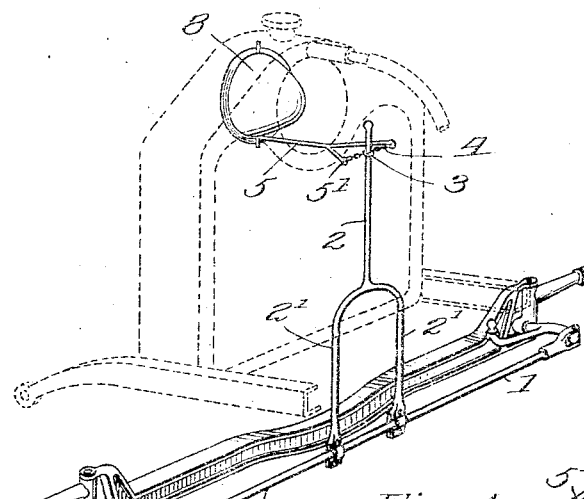
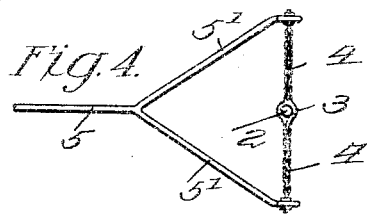
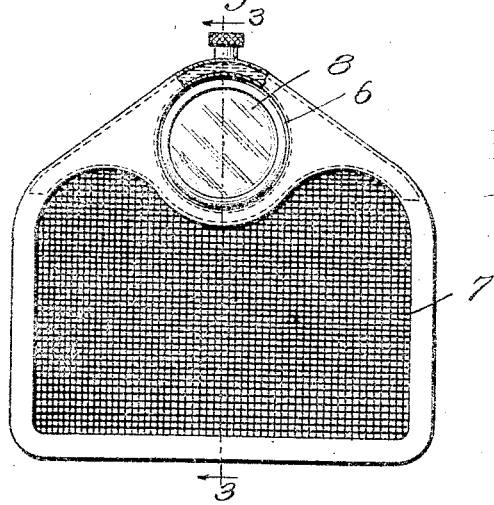
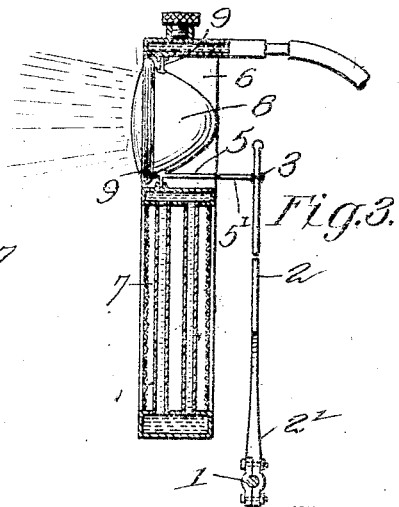
WITNESSES
A. E. Wade
H. E. Beck
INVENTOR
HENRY L. HUBBARD
BY Munn & Co.
ATTORNEYS

UNITED STATES PATENT OFFICE.

HENRY LEWIS HUBBARD, OF CLEVELAND, OHIO.

HEADLIGHT ATTACHMENT FOR AUTOMOBILES.

1,124,024.  Specification of Letters Patent.  Patented Jan. 5, 1915.

Application filed May 19, 1914. Serial No. 839,544.

*To all whom it may concern:*

Be it known that I, HENRY L. HUBBARD, a citizen of the United States, and a resident of Cleveland, in the county of Cuyahoga and State of Ohio, have made an Improvement in Headlight Attachments for Automobiles, of which the following is a specification.

My invention is an improvement in the class of head-light attachments for automobiles in which the head-lights are pivoted and operatively connected with the steering mechanism so as to turn laterally with the front wheels of the machine, and thus at all times direct the rays of light in the direction the machine is going.

The details of construction, arrangement, and operation of parts are as hereinafter described, and illustrated in the accompanying drawing, in which—

Figure 1 is a perspective view showing my invention as applied to the front portion of an automobile. Fig. 2 is a face or front view—a portion being shown in section—of the radiator and head-light of an automobile. Fig. 3 is a vertical cross section, on the line 3—3 of Fig. 2. Fig. 4 is a plan view of a portion of the means for shifting the head-light.

In Figs. 1 and 2, the numeral 1 indicates the steering tie-rod ordinarily employed for connecting the pivoted journals of the front wheels of automobiles. To this tie-rod is bolted firmly a fork 2' of the vertical arm or rod 2, whose upper end is connected by a collar 3 and chains 4 with the rear fork 5' of a horizontal rod 5 that extends forward through an opening 6 in the radiator 7, and is connected at its front end with the pivoted head-light 8.

The head-light is arranged in the opening 6 in the radiator, as best shown in Fig. 3, and is provided at its upper and under sides with gudgeons or pivots 9, so that it may be turned on them as on a vertical axis for shifting its light laterally, or to the right or left. The collar 3 is applied tightly to the vertical forked rod 5 and the chains 4 connect said collar with the rear ends of the fork 5'.

It will now be apparent that, when the tie-rod 1 is shifted longitudinally for adjusting the front wheels at different angles, as required for guiding the vehicle, the vertical rod 2 is also shifted bodily with the tie-rod, while still retaining its vertical position, and consequently forked end 5' of the horizontal rod 5 is swung also to the right or left, which has the function of turning the head-light 8 on its pivots 9, correspondingly. Thus, the rays of the head-light are directed straight ahead, or laterally more or less, corresponding to the adjustment of the tie-rod 1.

I claim:—

The combination with an automobile radiator having an opening extending through its upper portion from front to rear, of a head-light pivoted in such opening at the front thereof, a horizontal rod connected with the head-light and extending rearward through the opening, a vertical rod attached to the rear end of said horizontal rod, and a steering rod for the front wheels of the machine, said vertical rod being attached thereto, as described.

HENRY LEWIS HUBBARD.

Witnesses:
GUSTAVE SPETH,
DAVID N. GIBSON.